United States Patent [19]

Gallagher

[11] Patent Number: 4,650,108
[45] Date of Patent: Mar. 17, 1987

[54] METHOD FOR FORMING HERMETIC SEALS

[75] Inventor: Brian D. Gallagher, Costa Mesa, Calif.

[73] Assignee: The United States of America as represented by the Administrator of the National Aeronautics and Space Administration, Washington, D.C.

[21] Appl. No.: 765,978

[22] Filed: Aug. 15, 1985

[51] Int. Cl.⁴ .......................... B23K 1/20; B05D 3/02
[52] U.S. Cl. ................................... 228/124; 228/209; 228/208; 427/229
[58] Field of Search ....................... 228/124, 209, 208; 427/229

[56] References Cited

U.S. PATENT DOCUMENTS

| | | | |
|---|---|---|---|
| 2,984,575 | 5/1961 | Fitch | 228/124 |
| 3,207,838 | 9/1965 | McCormack | 228/209 |
| 3,391,447 | 7/1968 | Ard | 228/124 |
| 3,593,412 | 7/1971 | Foote | 228/122 |
| 4,188,417 | 2/1980 | Lichtenberg | 427/229 |
| 4,262,040 | 4/1981 | Russo | 427/229 |
| 4,333,966 | 6/1982 | Deffeyes et al. | 427/229 |
| 4,399,090 | 8/1983 | Sprangers et al. | 427/229 |
| 4,418,099 | 11/1983 | Cuevos et al. | 427/229 |
| 4,459,264 | 7/1984 | Mizuhara | 427/229 |

FOREIGN PATENT DOCUMENTS 2203617  8/1973  Fed. Rep. of Germany ...... 228/122

Primary Examiner—Nicholas P. Godici
Assistant Examiner—Samuel M. Heinrich
Attorney, Agent, or Firm—Paul F. McCaul; John R. Manning; Thomas H. Jones

[57] ABSTRACT

A firmly adherent film 16 of bondable metal, such as silver, is applied to the surface 10 of glass or other substrate by decomposing a layer 14 of a solution of a thermally decomposable metallo-organic deposition (MOD) compound such as silver neodecanoate in xylene. The MOD compound thermally decomposes into metal and gaseous by-products. Sealing is accomplished by depositing a layer 18 of bonding metal, such as solder or a brazing alloy, on the metal film and then forming an assembly with another high melting point metal surface 20 such as a layer of Kovar. When the assembly is heated above the temperature of the solder, the solder flows, wets the adjacent surfaces and forms a hermetic seal between the metal film 14 and metal surface 20 when the assembly cools.

12 Claims, 14 Drawing Figures

METHOD FOR FORMING HERMETIC SEALS

ORIGIN OF THE INVENTION

The invention described herein was made in the performance of work under a NASA contract, and is subject to the provisions of Public Law 96-517 (35 USC 202) in which the Contractor has elected not to retain title.

TECHNICAL FIELD

The invention relates to forming hermetic seals between a high melting metal surface and a second surface of glass, ceramic, refractory or semiconductor and, more particularly, this invention relates to a method for depositing a film of bondable metal, such as silver, on the second surface.

It is very difficult to directly bond or seal the glass, ceramics, semiconductor or refractory surfaces. Most bonding or sealing materials, such as solders or brazes, will crack, peel or separate from these surfaces unless the surface has been pretreated to deposit a thin, adherent film of a bondable metal such as silver or its mixtures with other metals. The present processes utilized for depositing the bondable metal, such as electroless plating or vapor decomposition, requires special apparatus and processing or operate at high temperature. The vapor decomposition processes cannot be utilized with thermally sensitive substrates, such as photovoltaic cells or other semiconductors, since the high temperature required to decompose the compound can cause diffusion affecting the characteristics of the doped layers, electrodes or contacts.

STATEMENT OF THE INVENTION

An improved method of depositing a film of bondable metal on the surface of glass or other substrates is provided by the present invention. The method is reliable and provides a well-controlled, firmly adherent film of metal on the substrate at a low temperature. The film, once formed, can be subjected to high temperature such as during brazing without disruption of the film or removal from the surface. The method can also be utilized to selectively deposit films covering a portion of the surface such as a perimeter border pattern which can be used to selectively form an edge seal.

The method of the invention utilizes a thermally decomposable, metallo-organic deposition (MOD) compound dissolved in an organic solvent that vaporizes at low temperature. The amount of solvent can be varied to provide different viscosities. The solution of MOD compound is deposited on the substrate and the solvent is evaporated to form a layer of MOD. The layer is then heated to at least the decomposition temperature of the MOD compound. The MOD compound thermally decomposes into metal and gaseous by-products. The metal deposits as a firmly adherent film on the surface of the substrate. Selective portions of the layer can be decomposed to form metal patterns, such as a perimeter pattern, by use of masks or by use of a translatable light or heat source. The remaining layer of MOD compound can be removed in a solvent bath. Alternatively, the layer can be deposited in a pattern by a writing or masking technique.

Sealing is accomplished by depositing a layer of bonding metal, such as solder or a brazing alloy, on the metal film. A fluxing agent may be present, if desired, to prevent oxidation. An assembly of the metal part with another high melting surface, such as a metal-coated sheet of glass is then formed. The assembly is then heated while being biased by clamping or other pressure fixture to fuse the bonding alloy and join the two metal surfaces. Sealing, in special cases, could also be accomplished by ultrasonic bonding.

The MOD compounds utilized in the invention have high solubility in organic solvents and high uniform metal content providing a high, uniform deposit of metal at low concentration. The compounds decompose at low temperatures without going through a melting stage and completely form gaseous by-products without leaving a carbon deposit. The compounds are stable under ambient conditions, are non-toxic and produce non-toxic decomposition products.

The method of the invention can be utilized to form hermetic seals for solar photovoltaic elements or panels or microelectronic devices such as VLSI devices or hybrid microelectronics. The method can be utilized in any application requiring forming a seal between a glass, ceramic, semiconductor or refractory surface and a high melting metal surface.

These and many other features and attendant advantages of the invention will become apparent as the invention becomes better understood by reference to the following detailed description when considered in conjunction with the accompanying drawings.

DETAILED DESCRIPTION OF THE INVENTION

The metallo-organic decomposition (MOD) compound contains a heteroatom such as O, S or N bridging the metal ion to the organic group. The MOD compound can be selected from compounds of the formula:

MXR where M is the metal, X is the bridging atom and R is a thermally decomposable organic group containing from 2 to 20 carbon atoms. The bondable metal M preferably contains at least 90 percent of an inert, noble metal, such as silver. Up to 10 percent, usually 5 percent, of various other metals can be present as modifiers, such as Bi which acts as a fluxing agent or Pt to improve solderability. Other suitable alloying metals are Ni, Cr or Co.

The XR group can be selected from amines, amides, mercaptides or mono or dibasic carboxylic acids. Other representative MOD compounds are amine, alkoxides, and metal-pyridine complexes. The most well-behaved and preferred MOD compounds are metal carboxylate salts of the formula:

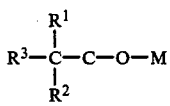

where $R^1$, $R^2$ and $R^3$ are aliphatic or aromatic hydrocarbon groups such as hydrogen, alkyl, alkoxy, alkyl-thio, phenyl, hydroxyalkyl, hydroxyphenyl and the like and the carbon content of the sum of $R^1$, $R^2$ and $R^3$ is from 2 to 14 carbon atoms. Preferably, at least one of $R^1$, $R^2$ and $R^3$ contains a secondary or tertiary carbon since such compounds are more soluble in organic solvent. The solubility also increases with increasing chain length of the organic radical. However, the metal content of the compound will decrease. The most preferred carboxylic acids are neodecanoates or 2-ethyl hexanoates.

The organic solvent may be chosen from a wide variety of materials, suitably halogenated hydrocarbons, such as chloroform or carbon tetrachloride; aliphatic materials such as kerosene or heptane; aromatic solvents such as benzene, toluene, xylene, or benzyl alcohol; alkanols such as methanol, ethanol or butanol; ketones such as acetone or MEK; acetones such as ethyl or butyl acetate; or esters such as ethyl ether. The MOD compound can be present in amounts up to the solubility limit, generally from 5 to 30 percent by weight. Other thermally decomposable materials, such as rheology adjusters, thickeners or plasticizers such as butyl carbitol, may be dissolved in the common solvent in amounts up to 10 percent by weight.

Representative MOD compounds utilizable in the method of the invention are neodecanoates or 2-ethyl hexanoates of Ag, 97.5 Ag 2.5 Pt, 96.5 Ag 1 Bi 2.5 Pt, 99 Ag 1 Bi, 97.5 Ag 2.5 Ni, 97.5 Ag 2.5 Co, 97.5 Ag 2.5 Cr.

The MOD compounds are prepared from the free carboxylic acid by first converting the acid to the ammonium salt at room temperature in aqueous ammonium hydroxide followed by an anion exchange of the metal with ammonium ion ($NH_4^+$). In the case of silver the silver neodecanoate is recovered as a white solid.

EXAMPLE 1

Figure 1:
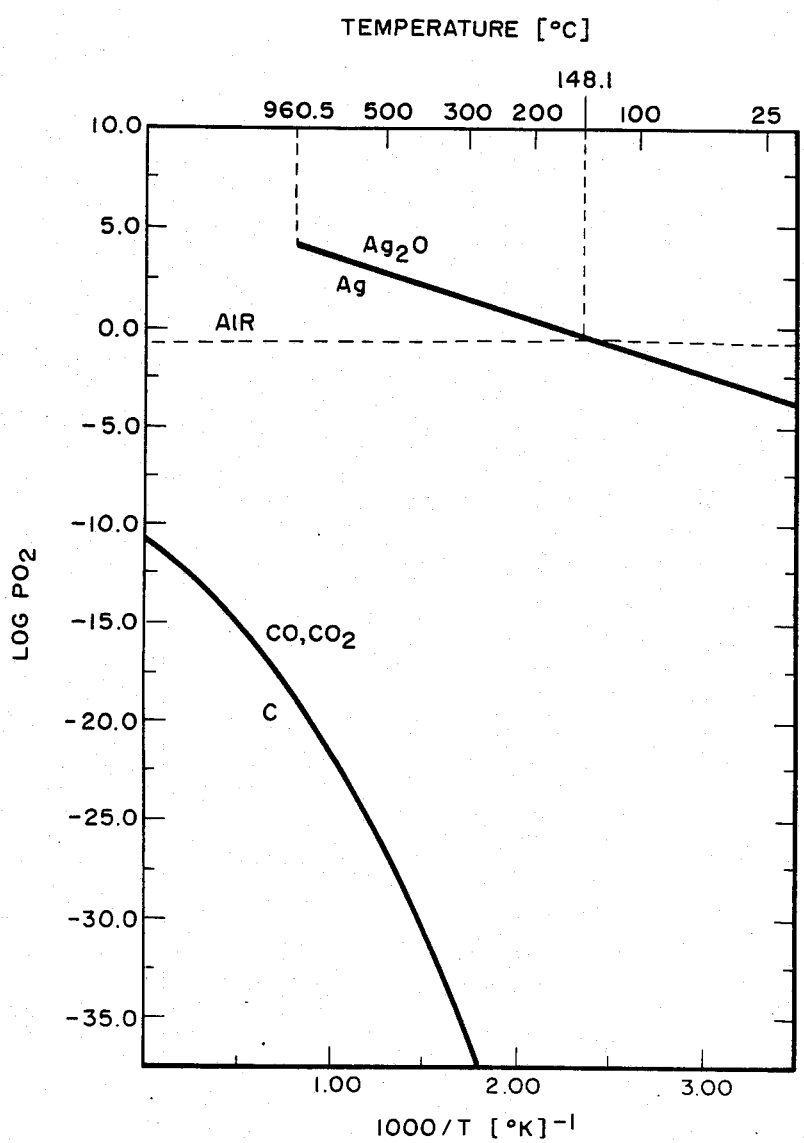
FIG. 1 is a phase stability diagram for the Ag-C-O system.
Figure 2:
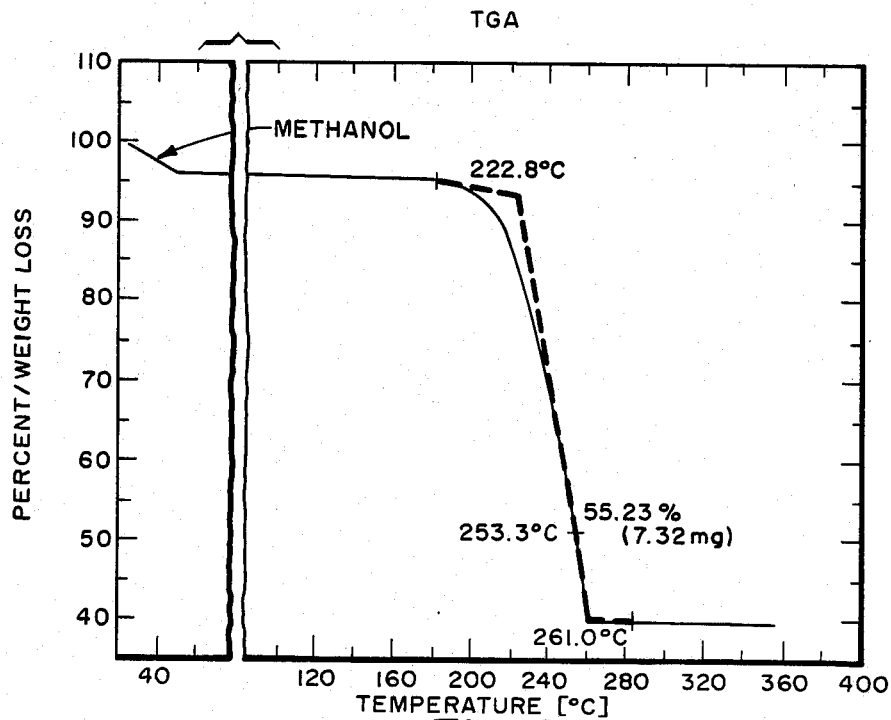
FIG. 2 is a thermogravimetric analysis (TGA) for silver neodecanoate dissolved in methanol.
Figure 3:
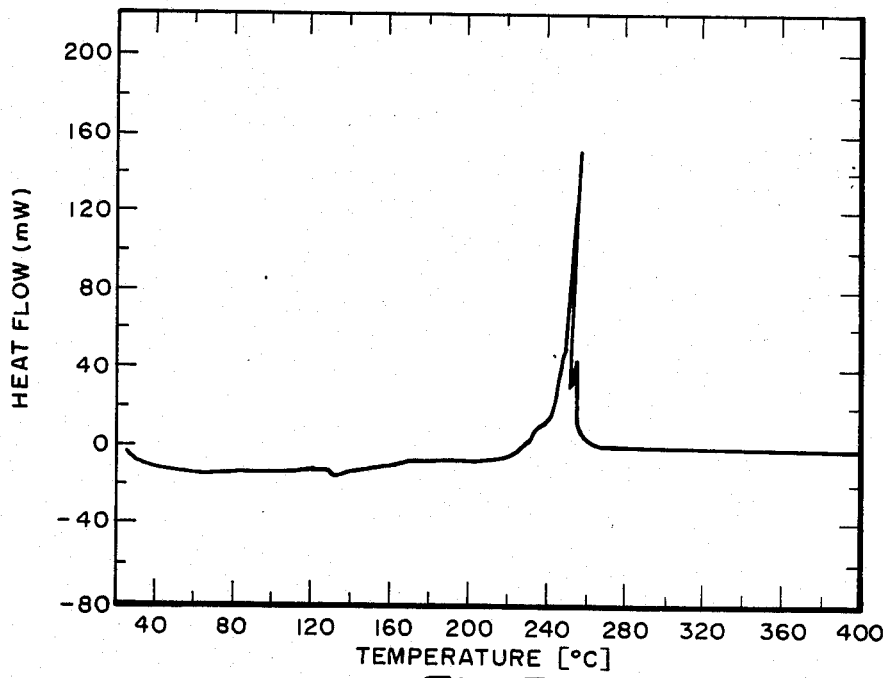
FIG. 3 is a differential scanning calorimeter DSC for the silver neodecanoate composition tested in FIG. 2.

A solution containing 30 percent by weight of neodecanoate (about 10 percent silver) in xylene was prepared. The phase stability diagram of this compound, as shown in FIG. 1, indicates there is a broad process window in which no carbon is formed and in which the only reaction products are Ag, CO and $CO_2$. This occurs during reaction in air at ambient pressure and temperatures above the decomposition temperature and below about 900° C. In the TGA shown in FIG. 2, the initial horizontal portion corresponds to evaporation of the methanol solvent. Decomposition starts at about 222.8° C. and is essentially completed at 261° C. This is confirmed by the DSC chart shown in FIG. 3 which shows a very well-behaved reaction at about 260° C.

The composition is applied as a layer on the surface of a substrate in an amount sufficient to form at least a monomolecular film of the metal. The metal film can be built up by electroplating or by successive deposition and decomposition of MOD layers. Generally, film thickness of over $10^{-3}$ in thickness of metal should not be deposited in a single application of MOD since the evolution of gaseous products may disrupt the continuity of the film.

Figure 4:
FIG. 4 is a cross sectional view of an assembly for forming a hermetic seal in accordance with the invention.
Figure 5:
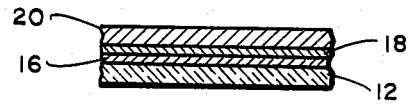
FIG. 5 is a cross-sectional view of the assembly in FIG. 4 after firing.
Figure 6A:
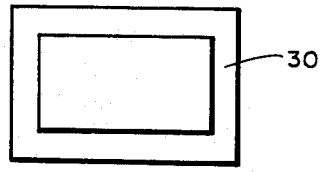
FIGS. 6(a)-(e) are a series of steps illustrating the formation of a hermetically sealed glass-glass sandwich according to the invention.
Figure 6B:
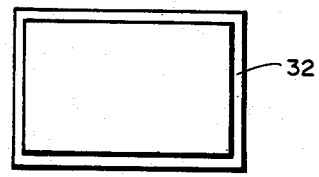
Figure 6C:
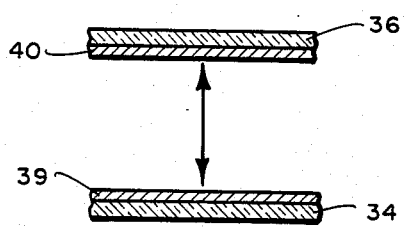
Figure 6D:
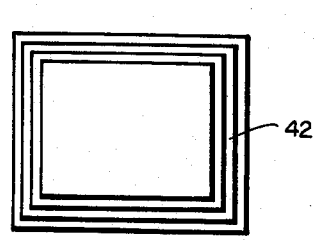
Figure 6E:
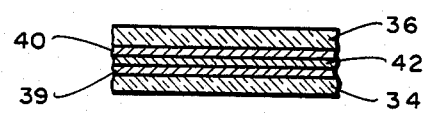

Referring now to FIG. 4, the silver MOD composition in solvent, for example xylene, is applied to a surface 10 of the substrate 12 and dried to form a layer 14. The layer 14 is heated to above 260° C. to decompose the MOD and form a silver film 16 shown in FIG. 5. An assembly is formed containing a layer 18 of bonding alloy such as solder and a further higher melting layer 20 of another metal such as Kovar. When the assembly is heated to above the temperature of the bonding layer 18, the alloy will form a bond firmly adhering the film 14 to the layer 20.

The bonding alloy is usually a solder or a brazing alloy. These materials melt at a lower temperature than the adjacent metal surfaces and wet these surfaces. When the molten alloy cools, a firm, gas impervious bond is formed. Lead-tin solders contain, on an atomic basis, from 25–50 percent tin, 49–74 percent lead and optional minor amounts of 0.05 to 2.5 percent of antimony, copper and bismuth, usually a maximum of 0.05 to 2.0 percent antimony; 0.08 percent copper and 0.25 percent bismuth. Soft solders contain from 25–50 percent lead, 25–50 percent tin and 25–50 percent bismuth and melt at temperatures from about 265° F. to 335° F.

Silver solders contain from 10 to 80 percent silver, 15 to 52 percent copper, 4 to 38 percent zinc and 3 to 16 percent of other materials such as Cd, P or Ni. These solders melt at temperatures from about 1200° F. to 1500° F. Brazing alloys are generally copper-zinc brass alloys and melt at a temperature from about 1000° F. to about 2000° C.

The layer 12 of MOD can be applied by brush, roller, screening, printing, spray, dip or spin-on techniques. The thermal decomposition can be effected by inserting the coated substrate in a furnace such as a resistance furnace or by means of a beam or coherent or incoherent light. An edge pattern may be applied by applying a narrow beam such as a laser along the edges of the surface or by printing a narrow line by ink-jet printing or other technique along the edge of the substrate.

The substrate can be any material not directly bondable to a high melting point metal. The invention is readily applicable to substrates such as glass, ceramics or refractories such as quartz, silica, titania or zirconia and semiconductors such as silicon or germanium or III-V compounds such as gallium arsenide. The high melting point surface can be any metal commonly formed by soldering or brazing such as iron, silver, gold, platinum, aluminum or alloys thereof.

Formation of a hermetically sealed assembly between two pieces of glass is illustrated in FIG. 6. In FIGS. 6a and 6b, a wide 30 border layer and narrow 32 border layer are deposited on two sheets 34, 36 of glass from a 38 percent solution of silver neodecanoate in xylene by means of an on demand ink jet printer. The coated glass sheets are heated in air at 260° C. to evaporate the xylene and decompose the silver neodecanoate to deposit a thin film 39, 40 of silver shown in FIG. 6d. The two sheets are assembled as shown in FIG. 6e and heated to the melting point of the solder 42 by means of a tungsten lamp to form an adherent assembly.

Formation of a hermetic seal for an integrated circuit is described in FIG. 7. As shown in the top view of FIG. 7a, a perimeter border film 50 of silver is deposited by decomposing a layer of silver neodecanoate on the surface 52 of a silicon chip 54. The chip 54 contains an integrated circuit 56 in the form of a stack of doped layers of semiconductor connected by a series of conductor paths.

Figure 7A:
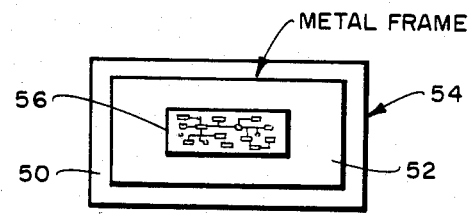
FIGS. 7(a)-(d) are a series of steps illustrating forming a hermetically sealed microelectronic device.
Figure 7B:
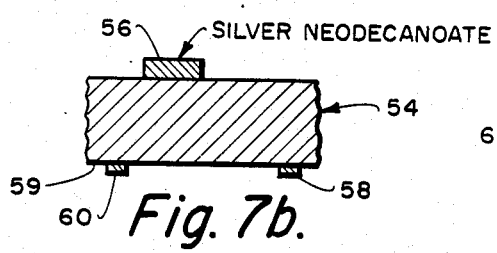
Figure 7D:
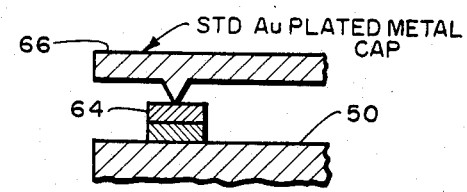
Figure 7C:
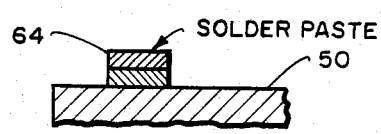

The integrated circuit 56 can be connected to other external devices by means of electrodes 58, 60 placed on the back surfaces 59 of the chip 54, as shown in FIG. 7b. A layer 64 of solder paste is applied to the film 50 and a standard cover, such as a gold plated metal cap 66, is placed on the solder layer 64 as shown in FIG. 7d. The assembly is heated to fuse and seal the solder to the silver film 50 and the cap 66, as shown in FIG. 7d.

The low temperature metallization sealing process can be utilized in any application requiring joining or sealing a glass, ceramic or semiconductor to a higher melting metal. The fusing of the solder or braze can be effected with a directed beam of radiation, by ultrasonic energy or by means of a heat gun.

It is to be realized that only preferred embodiments of the invention have been described and that numerous substitutions, modifications and alterations are permissible without departing from the spirit and scope of the invention as defined in the following claims.

I claim:

1. A method of forming a seal between a first metal surface having a high melting point and a second surface selected from glass, ceramic, refractory or semiconductor comprising the steps of:

applying a solution of a silver-organic compound in an organic solvent to the second surface to form a thin, uniform layer, said compound including a moiety containing an atom selected from O, N or S bridging a silver atom to an organic group;

evaporating the solvent from the solution to form a layer of said compound;

thermally decomposing the compound to form a film of silver adherent to the second surface;

depositing a layer of low melting point metal bonding material on the film;

placing the first surface on the layer of material to form an assembly; and heating the assembly to above the melting point of the material and soldering or brazing the second surface to the first surface to form a seal.

2. A method according to claim 1 further including the step of selectively decomposing the layer of compound to form a pattern of silver film and removing the remainder of the solution from the second surface.

3. A method according to claim 1 in which the high melting point metal surface is a coating on the surface of substrate.

4. A method according to claim 1 in which the bondable metal comprises silver containing up to 10 atomic percent of other metals.

5. A method according to claim 4 in which the other metals are selected from Pt, Cr, Co, Ni or Bi.

6. A method according to claim 5 in which the compound is selected from carboxylates, amines, alkoxides or metal pyridine complexes.

7. A method according to claim 3 in which the compound is a carboxylate of the formula:

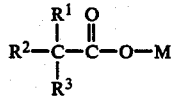

where M is silver of an alloy thereof and $R^1$, $R^2$ and $R^3$ are organic groups containing a total of 2 to 14 carbon atoms.

8. A method according to claim 7 in which $R^1$, $R^2$ or $R^3$ contain a secondary or tertiary carbon atom.

9. A method according to claim 8 in which the compound is selected from neodecanoates or 2-ethyl hexanoates.

10. A method according to claim 1 in which the bonding material is selected from a solder or brazing alloy.

11. A method according to claim 1 further including the step of selectively applying said solution to portions of the second surface to form a pattern.

12. A method according to claim 11 in which the pattern is in the form of a border on the second surface.

* * * * *